Figure 1:
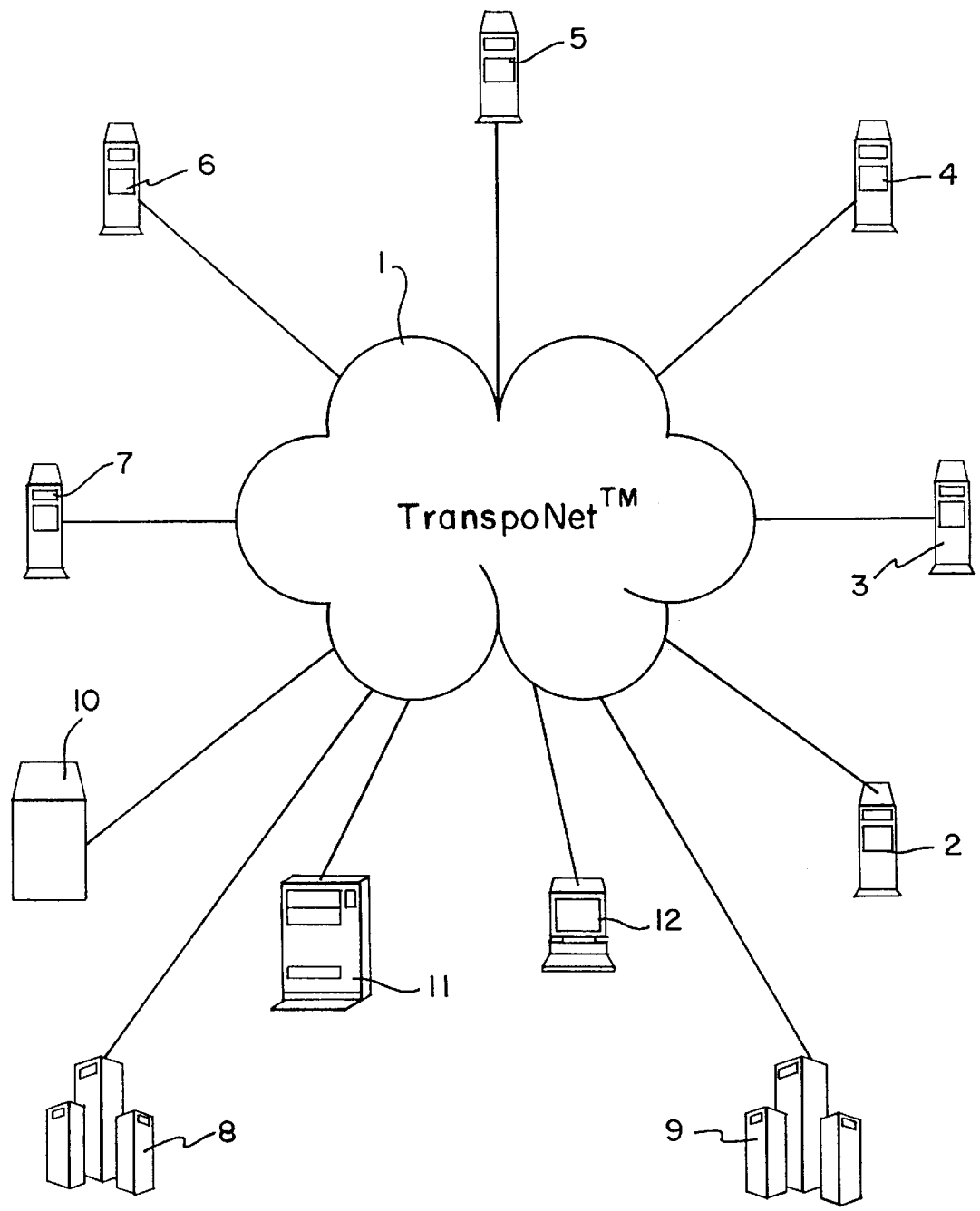

United States Patent [19]
Patel

[11] Patent Number: 5,953,706
[45] Date of Patent: Sep. 14, 1999

[54] TRANSPORTATION NETWORK SYSTEM

[75] Inventor: Apurva Patel, New York, N.Y.

[73] Assignee: Orissa, Inc., New York, N.Y.

[21] Appl. No.: 08/951,204

[22] Filed: Oct. 21, 1997

Related U.S. Application Data

[60] Provisional application No. 60/028,836, Oct. 21, 1996.

[51] Int. Cl.$^6$ .................................................. G06F 17/60
[52] U.S. Cl. ................................. 705/6; 705/26
[58] Field of Search ................ 705/5, 6, 26, 27; 395/200.36, 200.48, 200.68, 200.74; 709/206, 218, 238, 244

[56] References Cited

U.S. PATENT DOCUMENTS

| | | | |
|---|---|---|---|
| 2,594,960 | 4/1952 | May ............................................. | 705/5 |
| 2,910,238 | 10/1959 | Miles et al. .................................. | 705/5 |
| 3,134,016 | 5/1964 | Connolly et al. ............................ | 705/5 |
| 4,788,643 | 11/1988 | Trippe et al. ................................ | 705/6 |
| 4,862,357 | 8/1989 | Ahlstrom et al. ........................... | 705/6 |
| 4,922,439 | 5/1990 | Greenblatt ................................... | 705/6 |
| 5,006,983 | 4/1991 | Wayne et al. ................................ | 705/8 |
| 5,021,953 | 6/1991 | Webber et al. .............................. | 705/6 |
| 5,237,499 | 8/1993 | Garback ....................................... | 705/5 |
| 5,253,166 | 10/1993 | Dettelbach et al. ......................... | 705/5 |
| 5,255,184 | 10/1993 | Hornick et al. ............................. | 705/6 |
| 5,289,371 | 2/1994 | Abel et al. ................................... | 705/5 |
| 5,311,425 | 5/1994 | Inada ........................................... | 705/6 |
| 5,404,291 | 4/1995 | Kerr et al. ................................... | 705/5 |
| 5,404,523 | 4/1995 | DellaFera et al. ....................... | 395/671 |
| 5,422,809 | 6/1995 | Griffin et al. ............................... | 705/5 |
| 5,519,864 | 5/1996 | Martell et al. ........................... | 395/391 |
| 5,528,490 | 6/1996 | Hill ............................................ | 705/26 |
| 5,570,283 | 10/1996 | Shoolery et al. ........................... | 705/5 |
| 5,581,461 | 12/1996 | Coll et al. ................................... | 705/5 |
| 5,644,721 | 7/1997 | Chung et al. ................................ | 705/6 |
| 5,684,971 | 11/1997 | Martell et al. ........................... | 395/393 |
| 5,689,674 | 11/1997 | Griffith et al. ........................... | 395/393 |

OTHER PUBLICATIONS

CARS™ User Manual, 1996, 1997.
CAD™ User Manual, 1996, 1997.
TranspoNet™ User Manual, 1997.

*Primary Examiner*—Eric W. Stamber
*Attorney, Agent, or Firm*—Darby & Darby

[57] ABSTRACT

A transportation network system and method which integrates communications and data transmission requirements for ground transportation service providers into a single, centrally controlled network. The transportation network of the present invention provides for the seamless distribution of reservations data and other information between ground transportation service providers. Specifically, communications networks, such as the Internet and the World Wide Web, are used as the data distribution backbone between the various service providers. In one embodiment of the present invention, the service providers subscribe to the transportation network in order to be allowed to upload requests to the system, i.e., to other subscribers in distant locations, as well as to be allowed to download requests, i.e., to fulfill service requests issued by other service providers.

18 Claims, 3 Drawing Sheets

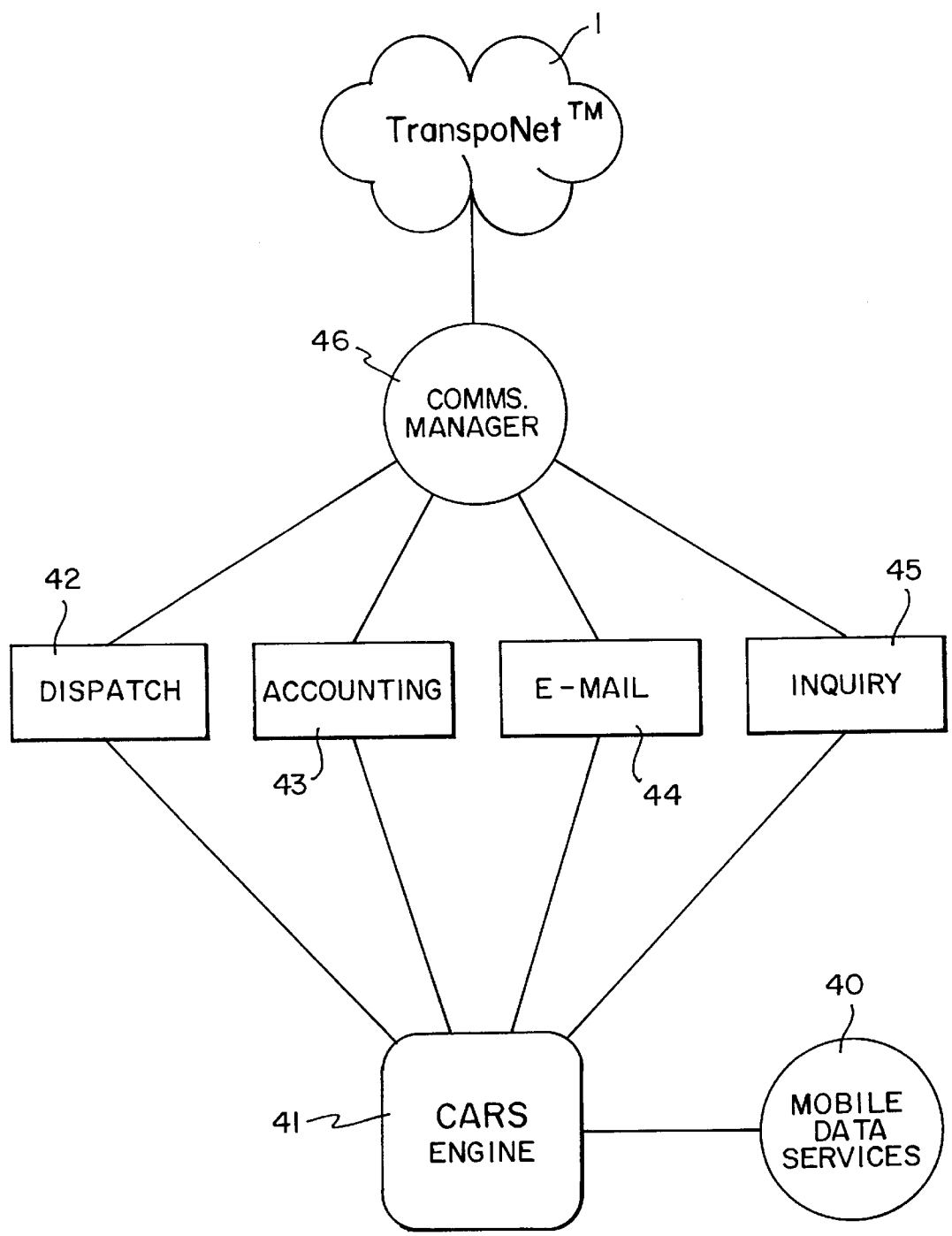

TRANSPORTATION NETWORK SYSTEM

The enclosed application is based on Provisional Patent Application Ser. No. 60/028,836 filed on Oct. 21, 1996 now abandoned. Applicant claims the benefit of the filing date of the aforesaid Provisional Application under 35 U.S.C. § 119(e)(1).

FIELD OF THE INVENTION

The present invention generally relates to the field of data communication systems. More specifically, the present invention relates to a data communications system for coordinating reservation data and other information for ground transportation services.

BACKGROUND OF THE INVENTION

An effective and efficient ground transportation system requires the timely flow of information between a ground transportation requester (user) and a ground transportation provider (provider). In a typical ground transportation system, a user requests ground transportation from point "A" to point "B". The request is submitted directly to a ground transportation provider who controls the scheduling and operation of one or more vehicles. The user's request is scheduled by the provider and a specific vehicle and/or driver are assigned to the particular request. The user receives confirmation of the request, including time and location information (both pick-up and drop-off) as well as vehicle and/or driver information.

The above-described system is commonly used in a limited geographical area because it is generally economically feasible to offer ground transportation in a geographical area limited to a maximum of a few hours travel time. One such application is a ground transportation service provider who provides transportation to/from an airport and the surrounding regions served by the airport. However, oftentimes a user requires ground transportation from the user's home (or business) to the airport, as well as ground transportation upon landing at a distant airport. To accommodate such requests, service providers will typically telephone an affiliated or related service provider in the destination city and relay the user's travel information and transportation requirements needed in the destination city. Although such a system provides ground transportation in both a local city and a destination city, the system has several disadvantages.

First, not every service provider will have a relationship with a counterpart service provider in every other city. Second, the system is more prone to errors since there are several stages where data is manually relayed and transcribed by the various service providers. Third, the relaying of information to a distant service provider and the subsequent scheduling by the distant service provider, who must then provide confirmation back to the local service provider, all involves a significant amount of time and expense (primarily the cost of telephone communications). Fourth, because the above-described process is cumbersome and time-consuming, the confirmation back to the user is often delayed.

SUMMARY OF THE INVENTION

The present invention is for a transportation network system and method which integrates communications and data transmission requirements for ground transportation service providers into a single, centrally controlled network.

The transportation network of the present invention provides for the seamless distribution of reservations data and other information between ground transportation service providers. Specifically, the Internet and the World Wide Web are used as the data distribution backbone between the various service providers. In one embodiment of the present invention, the service providers subscribe to the transportation network in order to be allowed to upload requests to the system, i.e., to other subscribers in distant locations, as well as to be allowed to download requests, i.e., to fulfill service requests issued by other service providers.

BRIEF DESCRIPTION OF THE DRAWINGS

Other objects, features and advantages of the invention discussed in the above brief explanation will be more clearly understood when taken together with the following detailed description of an embodiment which will be understood as being illustrative only, and the accompanying drawings reflecting aspects of that embodiment, in which:

FIG. 1 is a block diagram overview of the transportation network according to the present invention;

FIG. 2 is a block diagram overview of the internal operation of the transportation network according to the present invention; and FIG. 3 is a block diagram illustrating the connectivity between the transportation network according to the present invention and other transportation data services.

DETAILED DESCRIPTION OF A PREFERRED EMBODIMENT

Referring to FIG. 1, the present invention is for a transportation network system 1 (shown as TranspoNet™ and hereinafter referred to as the TN system 1) which integrates communications and data transmission requirements for ground transportation service providers into a single, centrally controlled network. TranspoNet™ is a computer-based application which is accessible via a comm.network such as the Internet (shown in FIG. 2 as the Internet 16); it is distributed by Orissa®, Inc. (headquartered in New York City). The TN system 1 provides for the seamless distribution of information between ground transportation service providers, such as, for example, a TN Provider Tampa 2, a Cars Site NYC 3, a Cars Site Boston 4, a TN Provider Seattle 5, a TN Provider L.A. 6 and a Cars Site Chicago 7. The TN system 1 can also be accessed by service requesters, such as, for example, corporate travel departments 8 and American Express™ travel 9. The service providers 2 to 7 can also be service requesters since they may request service in geographical areas remote from the area in which they operate. Both the service providers 2 to 7 and service requesters 8 and 9 are generally referred to as the subscribers 2 to 9.

The subscribers 2 to 9 access the TN system 1 via the Internet 16 or the World Wide Web, allowing for easy and universal access with almost any standard personal computer or other access device currently in use. The systems used by the subscribers 2 to 9 for such access to the Internet 16 or World Wide Web can vary widely among standard application programs. However, in the embodiment of the present invention illustrated in FIG. 1, the subscribers 3, 4 and 7 use a Cars™ dispatching system, illustrated as Cars sites. The Cars™ dispatching system is a standard integrated order taking, dispatching and accounting system distributed by Orissa®, Inc. and currently in use in the ground transportation market. *The CARS™ User Manual* 1996, 1997 and *The CAD™ User Manual* 1996, 1997 distributed by and available from Orissa®, Inc. 12 West 31st Street, N.Y. N.Y.

10001, provide a description of the operations of such system; it is incorporated in its entirety herein by reference. Therefore, such system will not be further described herein. The subscribers 2, 5 and 6 can also use any dispatching system, as long as an application programmer interface (also referred to as an API) is designed to be compatible with the data format and processing for communication with the TN system 1 constructed according to the present invention. In addition, the subscribers 2, 5 and 6 can access the TN system 1 through a form (not shown) on a web server 15 (shown in FIG. 2) which contains the TN system 1. Such form is a matter of design preference, so long as the same requirement as for the Cars™ dispatching system is met, namely, compatibility with the data format and processing for communication with the TN system 1. Accordingly, the selection or construction of a system (and/or an API) or a web server 15 form with which the subscribers 2, 5 and 6 can interact with the TN system 1 through the Internet 16 or World Wide Web is a matter of design preference which does not limit the present invention.

In an illustrative embodiment of FIG. 1, the information processed and distributed between the service providers 2 to 9 by the TN system 1 includes reservations data, accounting data and general information relevant to ground transportation. Such information is provided by numerous transportation resource systems. For example, as shown in FIG. 1, there are the following systems: a SABRE system 8, corporate travel departments 9, OAG (Official Airline Guide) interface 10 and other proprietary systems 11. The SABRE system 8, corporate travel departments 9 and OAG interface 10 are known and used in the ground transportation market. In addition, there are numerous additional resource systems, broadly described as the proprietary systems 11, which are accessible by the TN system 1. Each of these systems 8 to 11 are known and used in the ground transportation market for providing information to various systems, such as the TN system 1. The use and selection of such systems 8 to 11 is a design preference which does not limit the present invention. Moreover, since the systems 8 to 11 merely provide data to the TN system 1 and their operations are known, the systems 8 to 11 will not be described further herein.

The reservations data (not shown) which the TN system 1 processes and distributes includes request, acceptance and status data. Access to the TN system 1 allows subscribers 2 to 9 to look up ground transportation related information and to enter their own vehicle/reservation inventory, indicating how many reservations they can handle on a particular day. The TN system 1 can also query the subscribers 2 to 9 via their dispatching systems, for example, the Cars™ dispatching system, to obtain information about such subscribers 2 to 9. For example, the TN system 1 can obtain vehicle availability/inventory information by reading the contents of the dispatching system directly. Access to the TN system 1 also allows service providers 2 to 7 to retrieve reservations which are being directed to them from other subscribers 2 to 9 on the network, and also to confirm and update the reservation status of the particular reservations or requests that they are handling.

Accessing the TN system 1 also allows subscribers 2 to 9 to upload reservations information to allow other subscribers 2 to 7 to handle the reservations; to download reservations information for the reservations requests the particular subscriber 2 to 7 is to handle; and, to upload and download reservations status information.

Accounting data (not shown) is also processed and distributed by the TN system 1. The TN system 1 allows subscribers 2 to 7 to upload accounting and pricing information for the transportation requests that they are handling, as well as vehicle, driver and rate information. The TN system 1 can also query the subscribers 2 to 9 via their dispatching systems, for example, the Cars™ dispatching system, to obtain information about such subscribers 2 to 9. For example, the TN system 1 can obtain rate information by reading the contents of the dispatching system directly. Access to the TN system 1 also allows subscribers 2 to 9 to upload reservations requests for transportation in distant cities.

The TN system 1 of the present invention also handles reconciliation and accounting between subscribers 2 to 9. Each subscriber 2 to 9 can maintain an account with the TN system 1, and the TN system 1 acts as a clearinghouse for all reservations and payments. Periodically, the TN system 1 performs the accounting process by executing the following functions: scanning all rides; creating a credit entry in the account of the subscriber 2 to 7 who provided the ride; creating a debit entry in the account of the subscriber 2 to 9 who requested or originated the ride; scanning for any miscellaneous charges or adjustments and applying them to the respective subscriber 2 to 9 accounts; and printing a statement detailing each subscriber's 2 to 9 network activities. If a subscriber 2 to 9 owes money, then an invoice is issued and transmitted to the subscriber 2 to 9. If a subscriber 2 to 9 is owed money, then a check is issued and transmitted to the subscriber 2 to 9. All TN system 1 transactions are recorded and retained in system memory for archival and reference purposes. The subscriber 2 to 9 statements, invoices and payments may either be E-Mailed, faxed, or mailed to the individual subscribers 2 to 9.

The other general information (not shown) which the TN system 1 processes and distributes includes: landmark information, geodatabase information (address verification), directions, traffic information (text and/or images), major event information, construction schedules, flight arrival and departure information, flight number validation (OAG flight schedules), train arrival and departure information, train schedules, and weather information. The TN system 1 is also able to store full itinerary information, including hotel reservations and flight information. Such information can be entered by subscribers 2 to 9 or accessed by the TN system 1 itself (e.g., from one or more of the systems 9 to 11) for display by the TN system 1 and/or distribution to the subscribers 2 to 9.

Figure 2:
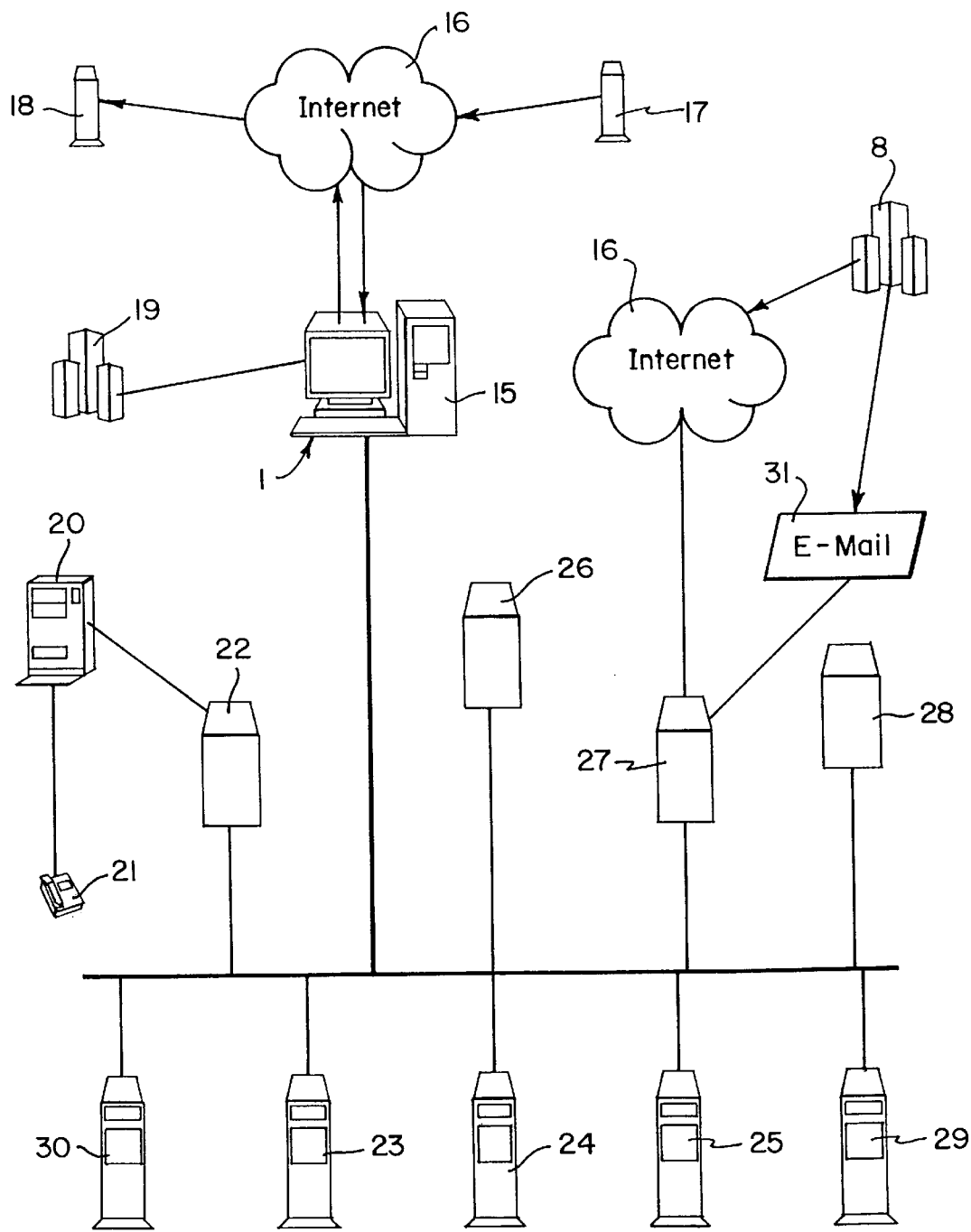

Referring to FIG. 2, there is shown a block diagram overview of the internal operation of the TN system 1 according to the present invention. The subscribers 2 to 9 are shown generically as a TN Member Service Requestor 17 and a TN Member Service Provider 18. For example, the TN Member Service Requestor 17 is one or more of the corporate travel departments 8 and the American Express™ travel 9 and the TN Member Service Provider 18 is one or more of the subscribers 2 to 7 shown in FIG. 1. Examples of the TN Member Service Provider 18 are as follows: car service, courier, ambulance, road service or, in alternative embodiments, utilities. In addition, examples of the TN Member Service Requestor 17 are as follows: corporate clients (e.g., multinational companies), airlines (e.g., crew and first class passengers), travel agencies and individuals which schedule their own transportation needs (e.g., one time members). Moreover, other types of Providers 18 and Requestors 17 involved in the ground transportation industry can use the TN system 1. In addition, a 3rd Party Systems Interface 19 represents the interface for one or more of the systems 8 to 11 or other third party systems accessed by the TN system 1 as a resource for information.

The TN system 1 of the embodiment shown in FIG. 1 further includes a series of servers 22 to 28 for implementing the operation of such system 1. The servers include a Reservation Transaction Server 22, a TN Members WEBSite Hosting Server 23, a SQL (Standard Query Language) Server-Credit Card Server 24, a SQL Server-Accounting 25, a Content/News Distribution Server 26, a Corporate Reservations Server 27 and a NetScape Secure Transaction Server 28.

The servers 22 to 28 are standard processors used by various systems, such as the TN system 1, for supporting the operations of such systems. The selection of particular servers is a matter of design preference which does not limit the present invention. Additionally, although shown as separate servers 22 to 28, the functionality of these servers may be provided by one or more separate hardware resources. The names of the servers 22 to 28 correspond to the operations of the TN system 1 which each such server 22 to 28 supports. More particularly, the servers 22 and 27 support the operations of the TN system 1 relating to the reservation data. Such servers 22 and 27 can also be accessed by and communicate with devices remote from the TN system 1. Namely, the server 22 of FIG. 1 also communicates with a Direct Talk-AIX 20 which, in turn, is accessed by phone links 21. In addition, the server 27 communicates with the corporate travel departments 8 via the Internet 16 and an E-Mail system 3 1. The servers 24 and 25 and the server 26 support the operations of the TN system 1 relating to the accounting data and the general information, respectively.

Also, the TN system 1 of FIG. 2 includes additional transportation resource systems and interfaces for accessing such resource systems. Namely, a RLM system 29 and a GeoDatabase and Landmarks system 30 are shown in addition to systems 8 to 11 and the interface 19 for accessing them. The RLM interface 29 provides access by the TN system 1 to a flight tracking system called FlightView® distributed by RLM Software™ (headquartered in Massachusetts). FlightView® provides real time flight status information. The RLM interface 30 can be used to provide general information or reservation data, such as, for example, to alert the TN Member Service Provider 18 to reschedule the reservation appointment time due to a delayed flight arrival. The GeoDatabase and Landmarks system 30 can also be used to provide general information to the TN system 1. In addition, the TN system 1 of FIG. 2 further includes the TN Members WEBSite Hosting Server 23. The server 23 supports the TN system 1 in enabling the TN Member Service Provider 18 to advertise their services and information about their company on the Internet 16, including, for example, registering the Provider's 18 domain name, creating a Web site, providing an address and setting up hosting services and providing hotlinks from the web site 15 containing the TN system 1 to the Provider's 18 web site. In addition, the web site enables the Provider 18 to accept reservations from their customers so that such reservations can be communicated directly into the Provider's 18 dispatching system, for example, the Cars™ dispatching system, via the TN system 1.

In alternative embodiments of the TN system 1 according to the present invention, the number of operations such as reservations, accounting, providing general information and/or web site services, can vary. For example, in an alternative embodiment, the TN system 1 can process solely the reservations operations, without supporting the accounting, general information and web site operations. Also, in further embodiments, the TN system 1 can support other operations currently known or hereinafter identified which are related to the ground transportation market. Accordingly, the number and type of operations, as well as servers 22 to 28 and systems 8 to 11 and 29 and 30, can be larger or smaller in number than those shown in FIGS. 1 and 2. Therefore, while the operations of the TN system 1 supported by the servers 22 to 28 are described as set forth below, the servers 22 to 28 themselves will not be further described herein. Such operations are described by the informational and transactional flow of the TN system 1.

The operation of the TN system 1 which can be supported by the servers 22 to 28 and systems 8 to 11 and 29 and 30 of the FIGS. 1 and 2 embodiment will now be described. Such operations are described by the informational and transactional flow of the TN system 1 with reference to a particular reservation/transportation example. The data flow is also presented in terms of where the data is being generated, processed and/or displayed, either at the originating site (New York City) by a service requestor 3 (shown in FIG. 1), the destination site (Los Angeles) by a service provider 6 (shown in FIG. 1) or the TN system 1 interconnecting the various sites.

EXAMPLE 1

New York City, Cars Site NYC 3

A transportation user books two reservations: one for pick-up in New York City and going to JFK International Airport, and the other for pick-up at LAX International Airport and going to downtown Los Angeles. The user's local transportation provider 3 handles the New York City to JFK transportation. The information pertaining to the user's Los Angeles area transportation needs are uploaded to the TN system 1.

The TN System 1

The TN system 1 acknowledges the uploaded reservations information and issues a transportation network ID number to the particular reservation. This ID number is downloaded to the requesting New York City service provider 3 (in this example, the Cars Site NYC 3 acts as both a service provider and a service requester). The TN system 1 selects a suitable transportation provider in the Los Angeles area (e.g., the TN Provider L.A. 6) to handle the reservation and downloads the reservation information to the Los Angeles service provider 6. The selection of a particular service provider in an area may be achieved in any of a number of ways, including random selection, rotation, preferred partner, price, size, etc. In turn, the Los Angeles service provider 6 uploads a confirmation number to the TN system 1, which the TN system 1 then relays to the requesting New York City service provider 3. The TN system 1 also enters the reservation into its central monitoring database.

Los Angeles, TN Provider L.A. 6

The reservations information is displayed on the Los Angeles subscriber's 6 computer terminal.

The TN System 1

Any change in information communicated to the TN system 1, either from the New York site 3, the Los Angeles site 6, or an internal status update (e.g., from the OAG/RLM flight information database) is immediately and automatically communicated to the various sites and all the databases at the various sites are synchronized with the identical information.

Los Angeles, TN Provider L.A. 6

The Los Angeles service provider 6 assigns a particular vehicle ID to the reservation and dispatches it at a predetermined time prior to the actual pick-up time. This status information with respect to the reservation is communicated back to the TN system 1.

The TN System 1

The TN system 1 continuously monitors the reservations database. If a dispatch confirmation is not received from the selected Los Angeles service provider 6 by a certain deadline, the reservation is reassigned to the next available Los Angeles service provider (not shown). The service provider in New York city, the Cars Site NYC 3, is also notified and can reassign the reservation itself by sending such request to the TN system 1. In addition, if no service provider is assigned or available in Los Angeles, an alert is generated and customer service is notified in order to effect alternative remedial action.

When the dispatch confirmation is received from the Los Angeles service provider 6, it is also passed along to the New York service provider 3. By keeping the originating New York service provider 3 fully apprised of the status of the Los Angeles reservation, the user is able to always call their originating service provider for status information relating to reservations anywhere else. This feature allows ease of operation from a user point of view, since there is only a single point of contact (the originating New York service provider 3) with a single telephone number to be remembered. Also, a single point of contact is better able to provide customer service to their regular customers, instead of having the customer contact a different service provider for each city they are traveling in.

New York City, Cars Site NYC 3

The dispatch confirmation is received by the originating New York City service provider 3 and the reservation is cleared from its dispatch screen and moved to a monitoring screen which is used to monitor all out of town trips until the passenger is dropped off at his destination.

Los Angeles, TN Provider L.A. 6

The Los Angeles service provider 6 provides a pick-up confirmation to the TN system 1 upon pick-up of the passenger. This confirmation is received by the TN system 1 and passed along to the New York City service provider 3. The Los Angeles service provider 6 also provides a confirmation to the TN system 1 upon completion of the trip when the passenger is dropped off. Again, this confirmation is received by the TN system 1 and passed along to the New York City service provider 3.

The TN System 1

Upon receiving the completion of trip confirmation, the TN system 1 removes the trip from the central monitoring database and transfers the trip information to the historical database and to the accounting database to await final processing information.

New York City, Cars Site NYC 3

The New York City service provider 3 acknowledges the completion of the trip and moves the reservation record to a voucher verification database for subsequent pricing, billing and reconciliation with the TN system 1.

Los Angeles, TN Provider L.A. 6

The Los Angeles service provider 6 removes the reservation from the active database to the voucher verification database for pricing and expense calculation. The trip is priced by the Los Angeles service provider's 6 voucher verification personnel and/or automated system. Because the trip is identified as a TN system 1 trip, an accounting record is created and transmitted to the TN system 1.

The TN System 1

The TN system 1 receives the accounting record from the Los Angeles service provider 6 and updates its own databases to include this information. The TN system 1 also notifies the New York service provider 3 with the pricing information for the Los Angeles trip. Additionally, the TN system 1 creates an internal accounts receivable record for the Los Angeles service provider 6, and an internal accounts payable record for the New York service provider 3. The amounts calculated by the TN system 1 also take into account the service commission for the TN system 1 itself.

New York City, Cars Site NYC 3

The New York service provider 3 receives from the TN system 1 the pricing information for the Los Angeles trip. This information is then used to generate an invoice for the customer.

The TN System 1

Periodically (e.g., weekly) the TN system 1 reconciles all accounts payable and accounts receivable records and effects automatic payment/debit by way of an EFT (Electronic Funds Transfer) transaction.

The information in the TN system 1 of FIGS. 1 and 2 according to the present invention is maintained in several groups of logically and functionally related files (not shown). These include general data files: zip code database, county database, country database, state database, airport codes database, OAG flight database, landmark database, geodatabase, street to landmark cross reference database, train schedules, member database, member vehicle database, member rate database. The content data files of the TN system 1 include: flight arrival information, train arrival information, traffic information (text and images), construction schedules and major city events. The reservation databases include: transportation network ID number for each reservation, reservation capacity, current reservations, completed reservations (archive), voucher processed reservations, member account transactions, member account adjustments and member accounting. The TN system 1 also includes the necessary Internet 16 and website databases required for Internet 16 and website communication.

Referring to FIG. 3, there is shown a block diagram illustrating the connectivity between the TN system 1 according to the present invention and a Cars engine 41 (or any other dispatching system). Also, the connection between the TN system 1 and the Cars engine 41 is enabled by a dispatch function 42, an accounting function 43, an E-Mail function 44, an inquiry function 45 and a communication manager 46 (shown as the Comms Manager). The Cars engine 41 is a collection of one or more systems which the TN Member Service Requestor 17 or the TN Member Service Provider 18 use to implement their local ground transportation system and to act as a front end for communications with the TN system 1 where such communication is warranted. In addition, the Cars engine 41 can communicate with mobile data services 40, which are mobile communications devices in the vehicles of the Provider 18 in order to provide information directly to the drivers of such vehicles.

The Cars engine 41 is the processor for the mobile data services 40 as well as for communicating with the TN system 1. For example, where the Cars engine 41 supports a TN Member Service Provider 18 car service company in New York city and the requested pick-up and drop-off are both in the New York city local area, the Cars engine 41 will process and execute the reservation without invoking the TN system 1. On the other hand, where the same New York city car service company enters a reservation for a pick-up and delivery in Los Angeles, the Cars engine 41 will invoke the TN system 1.

The functions 42 to 45 are used to implement the reservation, accounting, general information and other operations as to the TN system 1. The dispatch function 42 is invoked by the Cars engine 41 during the normal reservation operations (as described in Example 1 above) for a reservation in a geographical area remote from the area in which the requester is located. The accounting function 43 is similarly invoked by the Cars engine 41 during the normal accounting operations (as also described in Example 1 above). The E-Mail and Inquiry functions 44 and 45, respectively, are invoked by the Cars engine 41 for all other communications between the Cars engine 41 and the TN system 1, such as, for example, general information or an alert when a reservation operation is delayed and alternative remedial action is needed. In addition, communications using functions 42 to 45 also occur as to information transmitted by the TN system 1 to the Cars engine 41. The Comms Manager 46 is the processor which uploads and downloads data to the TN system 1 based on instructions from the Cars engine 41 and the TN system 1, respectively.

As to the hardware components of the TN system 1 shown in FIGS. 1 to 3 which are used to implement the TN system 1 on the Internet 16, such components are known in the art, and include general purpose computers which can be readily configured and programmed by those of ordinary skill in the computer programming field. Accordingly, any hardware components which support the operations of the TN system 1 as described herein are within the scope of such invention.

The foregoing describes a transportation network system for processing and distributing reservation, accounting and general information among subscribers. It is to be understood that the above-described embodiments are merely illustrative of the principles of the invention. Additional embodiments of the TN system 1 are described in *The TranspoNet™ User Manual* 1997, distributed by and available from Orissa®, Inc., 12 West 31st Street, N.Y., N.Y. 10021. Various modifications and changes may be made thereto by those skilled in the art which will embody the principles of the invention and fall within the spirit and scope thereof. In addition, the invention is not to be considered limited by the specific examples illustrated herein, but by the appended claims.

What is claimed is:

1. A transportation network system for routing a transportation request between at least two transportation network subscriber systems, each of said at least two transportation network subscriber systems including at least one terminal for controlling transportation reservations in geographical areas, said transportation network system comprising:

a first subscriber system and a second subscriber system, said first subscriber system controlling said transportation reservations in a first geographical area and initiating said transportation request for performance in a second geographical area, said second geographical area being different from said first geographical area;

a central system for receiving said transportation request from said first subscriber system, said central system further automatically routing said transportation request to one of said at least two transportation network subscriber systems based on at least one predetermined routing rule, said predetermined routing rule including a rule wherein said transportation request is routed to said second subscriber system which controls transportation requests in said second geographical area;

after said central system receives a confirmation from said second subscriber system indicating an acceptance of said transportation request, said central system relays said confirmation to said first subscriber system; and after said central system relays said confirmation to said first subscriber system, said central system monitors and communicates a status of performance of said transportation request to said first subscriber system until completion of said transportation request by said second subscriber system.

2. The system in accordance with claim 1 further comprising:

a third subscriber system wherein at least said second subscriber system and said third subscriber system control said transportation reservations in overlapping geographical areas; and said central system utilizes a plurality of predetermined routing rules, said plurality of predetermined routing rules further comprising a second rule selecting said second subscriber system or said third subscriber system for routing said transportation request based on at least one of random selection, rotation, designation by said first subscriber system, and a number of respective transportation vehicles controlled by said second subscriber system and said third subscriber system.

3. The system in accordance with claim 1 wherein said transportation network system is implemented using an Internet or a World Wide Web.

4. The system in accordance with claim 1 wherein said central system further receives general information about a transportation industry and said second geographical area in which said transportation request is to be performed.

5. The system in accordance with claim 1 wherein said second subscriber system controls at least one of a car service, a courier service, an ambulance service, a road service and a utility service.

6. A transportation network system for routing a transportation request between at least two transportation network subscriber systems, each of said at least two transportation network subscriber systems including at least one terminal for controlling transportation reservations in geographical areas, said transportation network system comprising:

a first subscriber system and a second subscriber system, said first subscriber system controlling said transportation reservations in a first geographical area and initiating said transportation request for performance in a second geographical area, said second geographical area being different from said first geographical area;

a central system for receiving said transportation request from said first subscriber system, said central system further automatically routing said transportation request to one of said at least two transportation network subscriber systems based on at least one predetermined routing rule, said at least one predetermined routing rule including a rule wherein said transportation request is routed to said second subscriber system which controls transportation requests in said second geographical area;

said central system further receiving accounting information from said first subscriber system and said second subscriber system;

after said central system receives a confirmation from said second subscriber system indicating an acceptance of said transportation request, said central system relays said confirmation to said first subscriber system; and said central system calculates an accounts payable record for said first subscriber system and an accounts receivable record for said second subscriber system, and after said central system relays said confirmation to said first subscriber system, said central system monitors and communicates a status of performance of said transportation request to said first subscriber system until completion of said transportation request by said second subscriber system.

7. The system in accordance with claim 6 further comprising:

a third subscriber system wherein at least said second subscriber system and said third subscriber system control said transportation reservations in overlapping geographical areas; and said central system utilizes a plurality of predetermined routing rules, said plurality of predetermined routing rules further comprising a second rule selecting said second subscriber system or said third subscriber system for routing said transportation request based on at least one of random selection, rotation, designation by said first subscriber system, and a number of respective transportation vehicles controlled by said second subscriber system and said third subscriber system.

8. The system in accordance with claim 6 wherein said transportation network system is implemented using an Internet or a World Wide Web.

9. The system in accordance with claim 6 wherein said central system further receives general information about a transportation industry and said second geographical area in which said transportation request is to be performed.

10. The system in accordance with claim 6 wherein said second subscriber system controls at least one of a car service, a courier service, an ambulance service, a road service and a utility service.

11. A method for routing a transportation request between at least two transportation network subscriber systems, each of said at least two transportation network subscriber systems having at least one terminal for controlling transportation reservations in geographical areas, wherein a first subscriber system controls said transportation reservations in a first geographical area, the method comprising:

receiving at a central location said transportation request from said first subscriber system, wherein said transportation request is to be performed in a second geographical area, said second geographical area being different from said first geographical area;

sending a request acknowledgment of said transportation request to said first subscriber system;

executing at least one predetermined routing rule, wherein said at least one predetermined routing rule is for determining one of said at least two transportation network subscriber systems to which said transportation request is to be sent, said at least one predetermined routing rule including a rule wherein said transportation request is routed to a second subscriber system which controls transportation requests in said second geographical area;

routing said transportation request to said second subscriber system;

receiving at said central location an acknowledgment of receipt of said transportation request from said second subscriber system;

monitoring and updating said first subscriber system with a status of performance of said transportation request by said second subscriber system;

receiving at said central location a confirmation that said second subscriber system has completed performance of said transportation request; and notifying said first subscriber system that said second subscriber system has completed performance of said transportation request.

12. The method in accordance with claim 11 further comprising:

receiving at said central location airline flight change information associated with said transportation request;

modifying said transportation request based on said airline flight change information; and updating said first subscriber system and said second subscriber system with said modified transportation request.

13. The method in accordance with claim 11 further comprising:

storing said transportation request in a central transportation network database;

updating said central transportation network database with said status of performance of said transportation request by said second subscriber system; and displaying data in said transportation network database and providing said first subscriber system and said second subscriber system with access to said data.

14. The method in accordance with claim 11 wherein said central location is a Web site on an Internet or a World Wide Web for said second subscriber system.

15. A method for routing a transportation request between at least two transportation network subscriber systems, each of said at least two transportation network subscriber systems having at least one terminal for controlling transportation reservations in geographical areas, the method comprising:

receiving at a central location said transportation request from a first subscriber system, wherein said transportation request is to be performed in a second geographical area, said second geographical area being different from a first geographical area;

sending a request acknowledgment of said transportation request to said first subscriber system;

executing at least one predetermined routing rule, wherein said at least one predetermined routing rule is for determining one of said at least two transportation network subscriber systems to which said transportation request is to be sent, said at least one predetermined routing rule including a rule wherein said transportation request is routed to a second subscriber system which controls transportation requests in said second geographical area;

routing said transportation request to said second subscriber system;

receiving at said central location an acknowledgment of receipt of said transportation request from said second subscriber system;

monitoring and updating said first subscriber system with a status of performance of said transportation request by said second subscriber system;

receiving at said central location a confirmation that said second subscriber system has completed performance of said transportation request;

notifying said first subscriber system that said second subscriber system has completed performance of said transportation request;

receiving at said central location accounting information from said first subscriber system and said second subscriber system; and calculating an accounts payable record for said first subscriber system and an accounts receivable record for said second subscriber system.

16. The method in accordance with claim 15 further comprising:

receiving at said central location airline flight change information associated with said transportation request;

modifying said transportation request based on said airline flight change information; and updating said first subscriber system and said second subscriber system with said modified transportation request.

17. The method in accordance with claim 15 further comprising:

storing said transportation request in a central transportation network database;

updating said central transportation network database with said status of performance of said transportation request by said second subscriber system; and displaying data in said transportation network database and providing said first subscriber system and said second subscriber system with access to said data.

18. The method in accordance with claim 15 wherein said central location is a Web site on an Internet or a World Wide Web for said second subscriber system.

* * * * *